US012728594B2

(12) United States Patent
Lecompere et al.

(10) Patent No.: US 12,728,594 B2
(45) Date of Patent: Sep. 8, 2026

(54) MANUFACTURING SYSTEM CONFIGURED TO CARRY OUT A METHOD FOR ADDITIVELY MANUFACTURING A PLURALITY OF OPHTHALMIC DEVICES AND SUCH A METHOD

(71) Applicant: ESSILOR INTERNATIONAL, Charenton-le-Pont (FR)

(72) Inventors: Maxime Lecompere, Maisons-Alfort (FR); Laurent Huprel, Alfortville (FR); Pierre Leite, Breuillet (FR)

(73) Assignee: Essilor International, Charenton-le-pont (FR)

( * ) Notice: Subject to any disclaimer, the term of this patent is extended or adjusted under 35 U.S.C. 154(b) by 181 days.

(21) Appl. No.: 18/569,985

(22) PCT Filed: Aug. 9, 2022

(86) PCT No.: PCT/EP2022/072386
§ 371 (c)(1),
(2) Date: Dec. 13, 2023

(87) PCT Pub. No.: WO2023/017056
PCT Pub. Date: Feb. 16, 2023

(65) Prior Publication Data

US 2024/0269923 A1 Aug. 15, 2024

(30) Foreign Application Priority Data

Aug. 11, 2021 (EP) .................................... 21306113

(51) Int. Cl.
*B29C 64/182* (2017.01)
*B29C 64/135* (2017.01)
(Continued)

(52) U.S. Cl.
CPC .......... *B29C 64/182* (2017.08); *B29C 64/135* (2017.08); *B29C 64/209* (2017.08);
(Continued)

(58) Field of Classification Search
CPC ... B29C 64/182; B29C 64/124; B29C 64/129; B29C 64/135; B29C 64/205;
(Continued)

(56) References Cited

U.S. PATENT DOCUMENTS

2018/0272598 A1 9/2018 Cox et al.

FOREIGN PATENT DOCUMENTS

EP 3566869 A2 * 11/2019 ............. B29C 64/25
EP 3626428 A1 * 3/2020 ........... B29C 64/393
WO 2020201581 A1 10/2020

OTHER PUBLICATIONS

International Search Report for PCT/EP2022/072386 mailed Nov. 14, 2022, 3 pages.

(Continued)

*Primary Examiner* — Jamel M Nelson
(74) *Attorney, Agent, or Firm* — NIXON & VANDERHYE

(57) ABSTRACT

A manufacturing system carries out a method for additively manufacturing ophthalmic devices, and includes a tank filled with a predetermined material, a single curing device for curing volumes of the predetermined material to harden layers of the ophthalmic devices, a layering device for layering volumes of the predetermined material onto harden layers of the ophthalmic devices. The manufacturing system includes building platforms movable relative to the tank and on which are supported the ophthalmic devices. The number
(Continued)

of building platforms is determined by the predetermined material, curing time for the single curing device to cure a volume of the predetermined material, and a layering time for the layering device to provide a volume of the predetermined material to form a subsequent layer for hardening, so the layering device and the single curing device perform respectively curing and layering simultaneously on layers from different ophthalmic devices.

14 Claims, 5 Drawing Sheets

(51) Int. Cl.

| | |
|---|---|
| ***B29C 64/209*** | (2017.01) |
| ***B29C 64/245*** | (2017.01) |
| ***B29C 64/259*** | (2017.01) |
| ***B33Y 10/00*** | (2015.01) |
| ***B33Y 30/00*** | (2015.01) |

(52) U.S. Cl.
CPC .......... *B29C 64/245* (2017.08); *B29C 64/259* (2017.08); *B33Y 10/00* (2014.12); *B33Y 30/00* (2014.12)

(58) Field of Classification Search
CPC ... B29C 64/209; B29C 64/214; B29C 64/218; B29C 64/227; B29C 64/236; B29C 64/245; B29C 64/255; B29C 64/259; B29C 64/264; B29C 64/268; B29C 64/273; B29C 64/393; B33Y 10/00; B33Y 30/00; B33Y 50/02
See application file for complete search history.

(56) References Cited

OTHER PUBLICATIONS

Written Opinion of the ISA for PCT/EP2022/072386 mailed Nov. 14, 2022, 4 pages.

* cited by examiner

Layer n
Area A
Area B
Area C
Area D
Layer n+1
Area A
Area B
Area C
Area D
100
110
120
130
140
150
160
170

MANUFACTURING SYSTEM CONFIGURED TO CARRY OUT A METHOD FOR ADDITIVELY MANUFACTURING A PLURALITY OF OPHTHALMIC DEVICES AND SUCH A METHOD

CROSS-REFERENCE TO RELATED APPLICATIONS

This application is the U.S. national phase of International Application No. PCT/EP2022/072386 filed Aug. 9, 2022, which designated the U.S. and claims priority to EP 21306113.8 filed Aug. 11, 2021, the entire contents of each of which are hereby incorporated by reference.

FIELD OF THE DISCLOSURE

The disclosure relates to a manufacturing system configured to carry out a method for additively manufacturing a plurality of ophthalmic devices and such a method for additively manufacturing such a plurality of ophthalmic devices.

BACKGROUND ART

Known methods for additively manufacturing a plurality of ophthalmic lenses comprise curing steps and layering steps which are performed successively in a manufacturing system which comprises a curing device, a layering device and a building platform located in relation to a vat filled with a predetermined material.

For instance, the plurality of ophthalmic lenses are built layer by layer on the building platform which is movable relative to the vat including a volume of the predetermined material. The building platform is located in a predetermined position, the curing device including an irradiation source performs the curing step of a first layer of material, the layering device performs the layering step at least thanks to a displacement of the building platform so that a novel layer of material having a predetermined thickness can be cured, etc.

In other words, in such known methods, a curing step is performed on a layer which is for instance liquid for the plurality of ophthalmic lenses to be manufactured on the building platform. The liquid layer is thus hardened and next a layering step is performed for forming a novel liquid layer on the previous hardened layer of the plurality of ophthalmic lenses to be manufactured.

However, the layering step may often require a substantial process time compared to the curing step, especially in the field of additively manufacturing ophthalmic lenses where an optical quality corresponding at least to a high resolution is required.

In view of mass production requirements, some manufacturing systems comprise a plurality of curing device in order to cure a larger area on the building platform in a single curing step.

SUMMARY OF THE DISCLOSURE

The disclosure is directed to a manufacturing system configured to carry out a method for additively manufacturing a plurality of ophthalmic devices, and to the method for additively manufacturing a plurality of ophthalmic devices including curing and layering steps.

The disclosure accordingly provides a manufacturing system configured to carry out a method for additively manufacturing a plurality of ophthalmic devices, the manufacturing system comprising at least one tank filled with a volume of a predetermined material, a single curing device configured for curing volumes of the predetermined material so as to harden layers of the ophthalmic devices to be manufactured, a layering device configured for layering volumes of the predetermined material onto harden layers of the ophthalmic devices to be manufactured, wherein the manufacturing system comprises a determined number of building platforms movable relative to the at least one tank and on which are supported the ophthalmic devices to be manufactured, the number of building platforms being determined at least in function of the predetermined material, a curing time for the single curing device to cure a volume of the predetermined material to form a hardened layer of at least one ophthalmic device, and a layering time for the layering device to provide a volume of the predetermined material to form a subsequent layer to be hardened of at least one ophthalmic device; the number of building platforms being determined so that the layering device and the single curing device are able to perform respectively a curing step and a layering step simultaneously on layers of different ophthalmic devices.

Thanks to the manufacturing system according to the disclosure, it is possible to additively manufacture a plurality of layers of a predetermined material on different building platforms with the same and single curing device and thanks to curing and layering steps which are performed at least partially at the same time but on different building platforms and thus for different ophthalmic devices.

The single curing device is used successively for performing at least one curing step on each of said building platforms.

The number of building platforms can be determined so that there is no need to wait to perform curing steps of the new layer(s) n of all the ophthalmic devices on the buildings platforms before beginning the layering of new layers n+1, so that the production time can thus be reduced.

The curing steps (for the layer n of an individual device to manufacture) take generally less time than the layering steps, so that the curing steps can be made continuously or sequentially, excluded or not a displacement time of the curing device, from a layer on a building platform to the subsequent layers on the subsequent building platforms, platform by platform and layer by layer. Regarding the disclosure, this is further true for curing all the layers n of the devices to manufacture present on a same building platform.

The layering steps depends of the process time for layering a layer on the building platform compared to the process time for curing a building platform. The layering steps can be made continuously or sequentially, platform by platform and/or simultaneously on several platforms.

Such process times are thus useful for determining the number of building platforms.

The manufacturing system may comprise a plurality of building platforms distinct and movable relative to each other and to the at least one tank.

The manufacturing system may be configured so that the single curing device is able to perform a curing step on one or several building platforms while the layering step is able to perform a layering step on one or several others building platforms.

The manufacturing system may comprise a determined number of layering devices, the number of layering devices being determined in function of the number of building platforms, the curing device, the curing time and the layering time.

The manufacturing system may comprise a layering device dedicated to each or several building platforms.

The at least one tank may comprise one or a plurality of compartments and at least one building platform is movable relative to a dedicated compartment.

Each building platform may comprise a determined size and a determined shape, the size and the shape of the building platform being determined in function of a number of ophthalmic devices to be manufactured and/or at least a shape of said ophthalmic devices, and in relation to the curing time and/or the layering time.

The manufacturing system may comprises a processing unit which is configured to process data about the predetermined material(s), the number of building platforms and/or the size and the shape of each building platform, and/or the number of layering devices, and/or the curing time and/or the layering time, and to provide an optimized arrangement of the manufacturing system.

The manufacturing system may comprises interchangeable modules comprising at least a building platform and optionally a dedicated layering device and/or a compartment of the tank, the number and the type of modules being determined in function of the optimized arrangement.

The single curing device may be formed by a digital light processing unit and/or a stereolithography unit including a laser source and a scanning head.

The layering device may be formed by a transparent window with optionally a membrane located in the at least one tank in front of the building platform; or by a provider of additional material such as a recoater, or at least one print head, or a at least one nozzle.

The disclosure further provides a method for additively manufacturing a plurality of ophthalmic devices, comprising the steps of: curing a first volume of a predetermined material on a first building platform so as to harden a layer of one or several ophthalmic devices to be manufactured and supported on said first building platform; next curing a second volume of the predetermined material on a second building platform which is distinct and movable relative to the first building platform, so as to harden a layer of one or several other ophthalmic devices to be manufactured and supported on said second building platform, said curing steps being performed successively by a single curing device; and layering a second volume of the predetermined material adjacent to the hardened layer located on said first building platform, said layering step being performed, thanks to a layering device and to a displacement of said first building platform together with the hardened layer, at the latest when the curing of the layer of said one or several ophthalmic devices supported on said first building platform is finished and during the step of curing the layer of said one or several another ophthalmic devices supported on said second building platform.

The method according to the disclosure thus comprises the step of additively manufacturing a plurality of layers of a predetermined material on different building platforms with the same and single curing device and thanks to curing and layering steps which are performed at least partially at the same time but on different building platforms and thus for different ophthalmic devices.

The single curing device is used successively for performing a curing step on each of said building platforms.

Thanks to the disclosure, there is no need to wait for the complete curing of all the layers of all the ophthalmic devices on the building platforms before beginning the layering, so that the production time can thus be reduced.

The method is iterative and when the first volume of the predetermined material on the last building platform has been cured, then a second volume of the predetermined material on the first building platform can be cured, etc.

It is to be noted that the curing steps, for curing the layer of one ophthalmic device, or according to embodiments of the disclosure, for curing the layers of ophthalmic devices present on a same building platform, takes generally less time than the layering steps, so that the curing steps can be made continuously, excluded or not the displacement time of the curing device, from the first layer on the first building platform to the subsequent layers on the subsequent building platforms, platform by platform and layer by layer.

Regarding the layering steps, it depends of the process time for layering a building platform compared to the process time for curing a building platform. The layering steps can in some cases be made continuously or sequentially, platform by platform and/or simultaneously on several platforms.

In the method subject-matter of the disclosure, the building platforms are duplicated so as to have more than one building platform and the layering steps are dedicated to the building platforms so that the layering steps are also duplicated and can be performed independently from each other on their respective platform, notably even if a curing step is performing in another platform, or if a curing step hasn't even started on another third platform.

Because the layering step of a building platform begins at the latest when the curing step of this building platform is finished, and depending of the number of platforms, curing process time and layering process time, some waiting time might happen or be added before curing a novel layer on the same platform and after the layering step. During such waiting time, the previous layer which has been hardened by the curing and which may continue to slightly harden is recovered by a volume of predetermined material due to the subsequent layering during said possible continuation of hardening.

The layering step may have a same duration for each layer of the ophthalmic devices manufactured on the building platforms.

The steps of curing may be performed by projecting and/or scanning and polymerizing at least one image on a surface of a volume of the predetermined material.

Depending on the curing device, the steps of curing may be performed in a step mode, or in a scroll mode, or in a hatching or hatched mode.

The curing device may be formed by a digital light processing unit and/or a stereolithography unit including a laser source and a scanning head.

The building platforms are distinct and movable relative to each other and to the at least one tank.

A number of layering devices may be determined in function of the number of building platforms, the curing time and the layering time.

A layering device may be dedicated to each or several building platforms.

The at least one tank may comprise one or a plurality of compartments and at least one building platform may be movable relative to a dedicated compartment.

Each building platform may comprise a determined size and a determined shape, the size and the shape of the building platform being determined in function of a number of ophthalmic devices to be manufactured and/or at least a shape of said ophthalmic devices, and in relation to the curing time and/or the layering time.

The steps of layering, curing and displacing the building platforms may be commanded, controlled and/or operated by a processing unit which is configured to process data about the predetermined material, the number of building platforms and/or the size and the shape of each building platform, and/or the number of layering devices, and/or the curing time and/or the layering time, and to provide an optimized arrangement of the manufacturing system.

The method may comprise the step of selecting interchangeable modules comprising at least a building platform and optionally a dedicated layering device and/or a compartment of a tank, the number and the type of modules being determined in function of the optimized arrangement.

The layering device may be formed by a transparent window and optionally a membrane located in the at least one tank in front of the building platform; or by a provider of additional material such as a recoater, or a print head, or a nozzle.

BRIEF DESCRIPTION OF THE DRAWINGS

The description of the disclosure now continues with a detailed description of embodiments given hereinafter by way of non-limiting example and with reference to the appended drawings.

DETAILED DESCRIPTION OF EXAMPLE EMBODIMENTS

Figure 1:
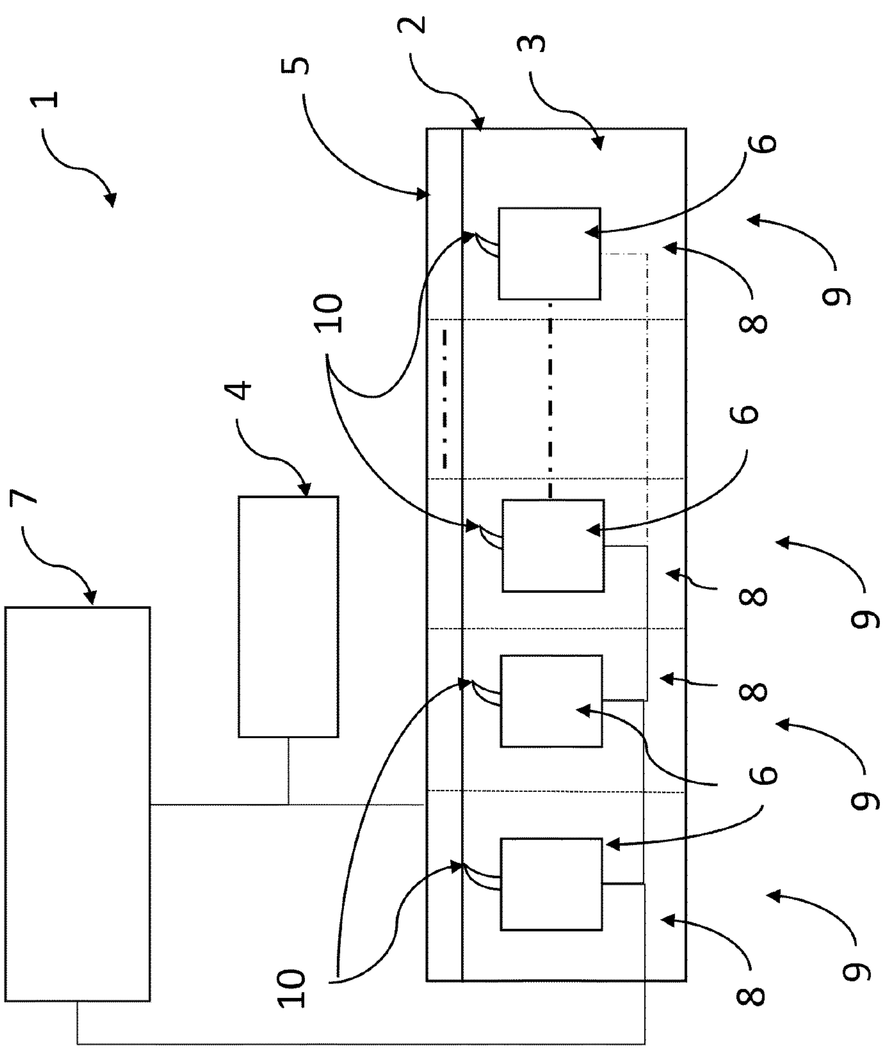
FIG. 1 represents schematically a manufacturing system configured to carry out a method for additively manufacturing a plurality of ophthalmic devices.

FIG. 1 shows schematically a manufacturing system 1 configured to carry out a method for additively manufacturing a plurality of ophthalmic devices 10.

For instance, the ophthalmic devices 10 are ophthalmic lenses and in particular spectacle lenses.

The system 1 comprises at least one tank 2 filled with a volume of a predetermined material 3, such as a polymer resin.

The system 1 comprises a single curing device 4 configured for curing volumes of the predetermined material so as to harden layers of the ophthalmic devices 10 to be manufactured.

The single curing device 4 can be formed by a digital light processing (DLP) unit having one or several projector heads and/or a stereolithography unit including one or several laser sources and a scanning heads.

The single curing device 4 can thus be configured to perform curing steps in a step mode, or in a scroll mode, or in a hatching mode, depending of the type of device.

In the step mode, the single curing device 4 projects successive images in successive locations, step by step, and between two locations, the single curing device 4 generally does not project any image. In the scroll mode, the images are continuously refreshed in relation to the displacement of the single curing device 4 along each building platform 6. In the hatching mode, the single curing device 4 projects a single spot with a given spot size and will scan the entire cross sections of the parts to be built in a building platform taking into account the spot size and a given hatch spacing. It will continue with the next build platform in the same way.

The system 1 comprises one or a plurality of layering devices 5 configured for layering volumes of the predetermined material 3 onto harden layers of the ophthalmic devices 10 to be manufactured.

The layering device(s) 5 can be formed by one or several transparent windows and optionally a membrane located in the at least one tank 2 in front of a respective building platform 6; or by one or several providers of additional material such as recoater(s), or print head(s), or nozzle(s).

The system 1 comprises a determined number of building platforms 6 movable relative to the at least one tank 3 and on which are supported the ophthalmic devices 10 to be manufactured.

The building platforms 6 are distinct and movable relative to each other and to the at least one tank 2.

Each building platform 6 comprises a determined size and a determined shape and thus may comprise a determined number of ophthalmic devices 10.

The system 1 further comprises a control and command unit 7, also called processing unit, which is configured to control, command and/or operate the single curing device 4, the layering device 5 and each of the building platforms 6.

For instance, the processing unit 7 is able to control an operable time of the single curing device, also called curing time, an operable time of the layering device 5, also called layering time, and the displacement of each the building platforms 6 for manufacturing the layers of the ophthalmic devices 10.

To be noted that the curing time comprises a period during which the material is polymerised, or upon exposure, and may or not comprise a previous period during which the images are loaded into the single curing device 4.

To be noted also that once the exposure is finished, the polymerization, or curing, does not stop immediately but rather continues for a period. Such period can be called dark polymerization period, for which the kinetics, and amount of additional curing even after the exposure is finished, depends at least on a curing type of the predetermined material and on its composition.

On the basis that the curing steps take generally less time than the layering steps for any given platform, the curing steps can be made continuously, or sequentially, along the building platforms 6, excluded or not the displacement time of the single curing device 4. The layering steps is performed depending on the layering time for layering a building platform compared to the curing time for curing a building platform. The layering steps can be made continuously, platform by platform and/or simultaneously on several platforms.

The disclosure however states that at least for two different platforms, or for at least two different sets of devices to manufacture, the layering steps happen at different times, whether part of the process time overlaps or not.

The number of building platforms 6 are determined at least in function of the predetermined material 3, the curing time for the single curing device 4 to cure a volume of the predetermined material 3 to form a hardened layer of at least one ophthalmic device 10, and the layering time for the layering device(s) 5 to provide a volume of the predetermined material to form a subsequent layer to be hardened of at least one ophthalmic device 10.

To be noted that the predetermined material 3 has intrinsic properties such as viscosity, refractive index, etc.

The size and the shape of the building platform 6 can be determined in function of the number of ophthalmic devices 10 to be manufactured and/or at least a shape of the ophthalmic devices 10, including for instance the diameter, the outline, the curvature, the thickness and/or the spatial and/or printing orientation of the ophthalmic devices 10 on the building platforms 6.

The size and the shape of the building platform 6 can also be determined in relation to the curing time and/or to the layering time of at least a layer of an ophthalmic device 10.

The number of building platforms 6 and optionally its shape and its size are determined so that the layering device(s) 5 and the single curing device 4 are able to perform respectively a curing step and a layering step simultaneously on layers of different ophthalmic devices 10.

The system 1 allows to additively manufacture a plurality of layers of the predetermined material 3 on different building platforms 6 with the same and single curing device 4 and thanks to curing and layering steps which are performed at least partially at the same time but on different building platforms 6 and thus for different ophthalmic devices 10.

The number of building platforms 6 can be determined so that there is no need to wait for the complete curing of all the layers of the ophthalmic devices 10 on the buildings platforms 6 before beginning the layering, so that the production time can thus be reduced.

In other words, the single curing device 4 is able to perform a curing step on one or several building platforms 6 while the layering step is able to simultaneously perform a layering step on one or several others building platforms 6.

Thus in the machine and/or process of the disclosure, instead of having either the curing device working or the layering device working, at most times both the curing device and at least one layering device are working.

In addition, as stated above, several layering devices 5 can be used, each being dedicated to one or several building platforms 6.

The number of layering devices 5 can be determined in function of the number of building platforms 6, the curing time and the layering time of at least a layer of an ophthalmic device 10.

Thus, the system 1 comprises interchangeable modules 9 comprising at least one of the building platforms 6 and optionally a dedicated layering device 5 and/or a compartment 8 of the tank 2.

The processing unit 7 can be configured to process data about the predetermined material 3, the number of building platforms 6 and/or the size and the shape of each building platform 6, and/or also the number of layering devices 5, and/or the curing time and/or the layering time, and then to provide an optimized arrangement of the system 1.

Such optimized arrangement may be defined by a number and a type of modules 9.

The optimized arrangement of the system can be highly favourable to optimize the curing path and then the layering path. In particular, that can allows rendering a frequency of the exposure over the tank homogeneous, including all the ophthalmic devices 10 manufactured. Such homogenous exposure may improve the control of the curing of the material 3 and in particular the resin conversion induced by the polymerisation, including during the curing time and the dark polymerisation period.

For instance, the frequency of exposure and/or the duration of dark polymerization can be homogenous within one device and across all the devices so as to have mechanical and optical properties as repeatable and as controlled as possible.

In addition, using such modules 9 is a benefit for the process because any module can be loaded and/or unloaded without impacting the processing on the other modules 9, for instance for maintenance, or for unloading a module 9 in which the ophthalmic devices 10 are finished and loading a new module 9 with a new platform ready for starting to manufacture a new product.

Figure 2:
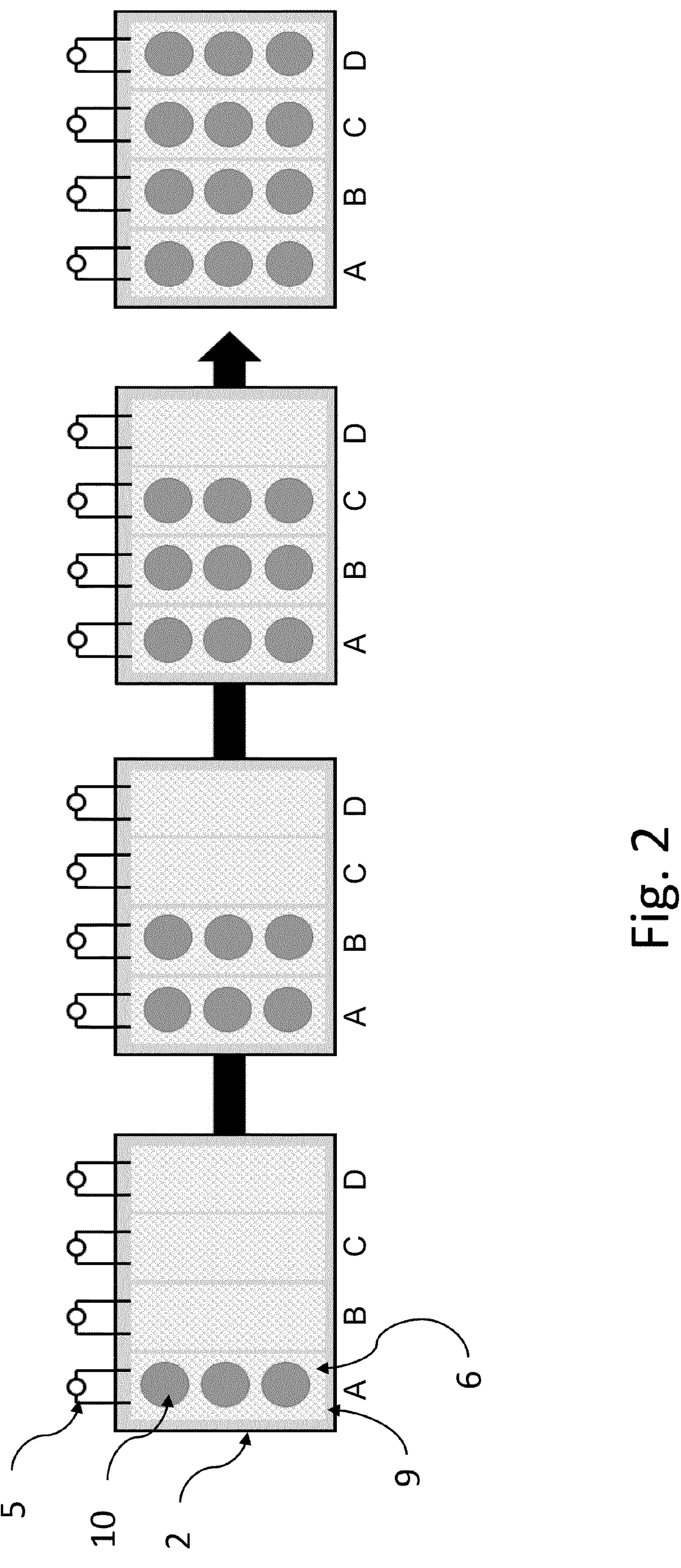
FIG. 2 represents schematically and partially the manufacturing system of FIG. 1 in which a plurality of ophthalmic devices are additively manufactured.
Figure 3:
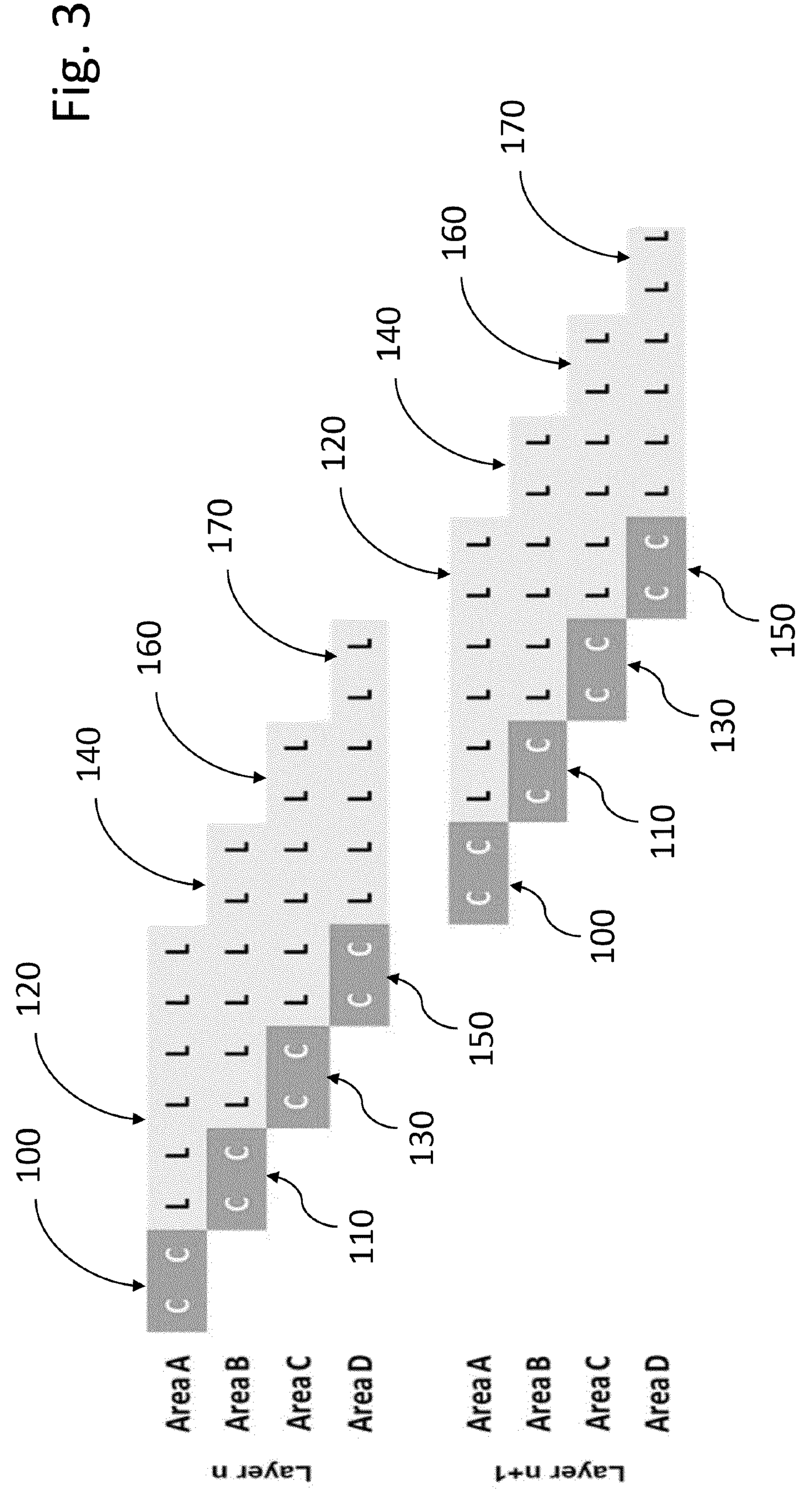
FIG. 3 shows schematically different steps of a method for additively manufacturing a plurality of ophthalmic devices thanks to the manufacturing system of FIGS. 1 and 2.
Figure 4:
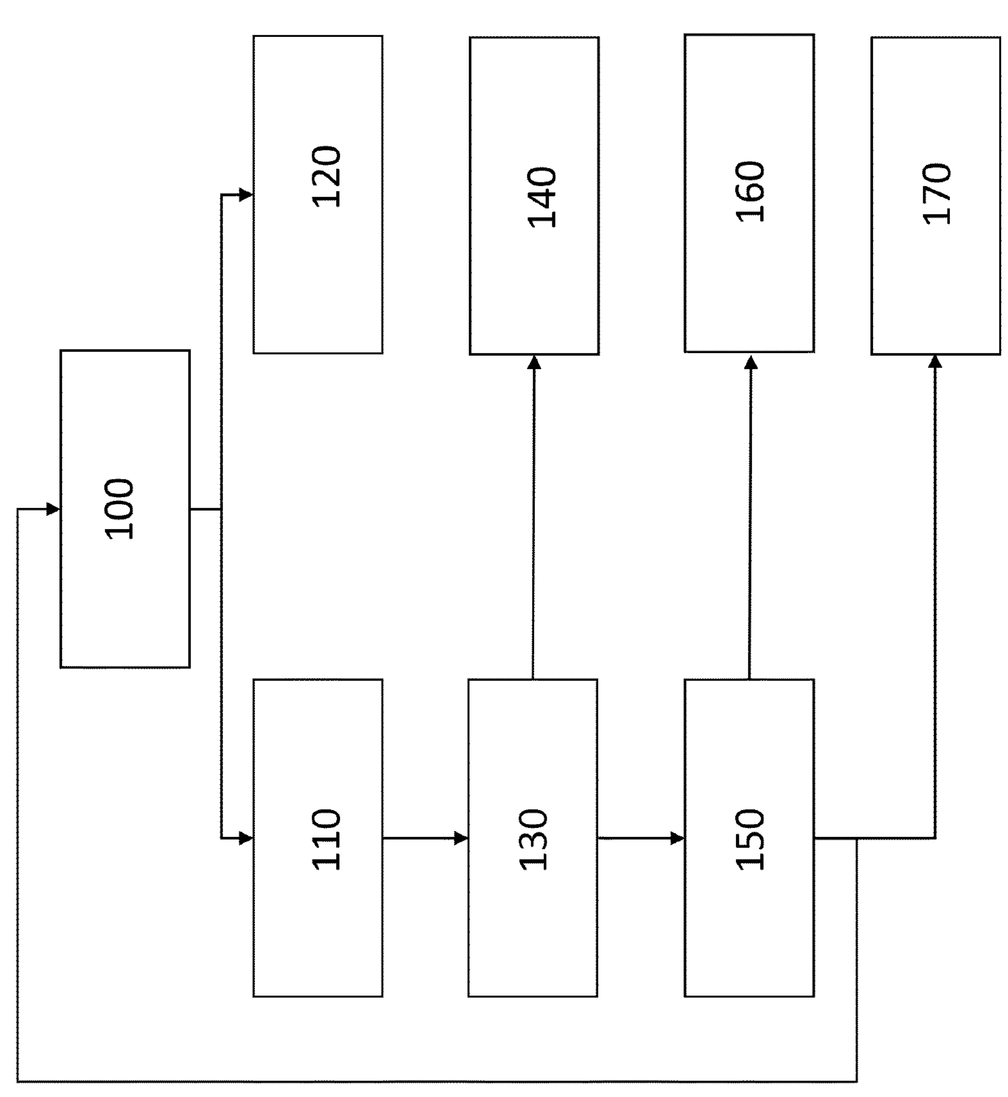
FIG. 4 is a view similar to FIG. 3 but illustrated in the shape of a bloc diagram.

FIGS. 2 to 4 illustrate a method for additively manufacturing a plurality of ophthalmic devices thanks to the system 1, respectively schematically and with bloc diagrams.

The system 1 comprises a single tank 1 in which are located four modules 9, each comprising one building platform 6 and a dedicated layering device 5, while the single curing device is not visible. The number of four modules is illustrative for the process in place.

The size and the shape of each building platform 6 are defined so that three ophthalmic devices 10 can be manufactured on each of them.

The building platforms 6 thus define manufacturing areas noted A to D on the drawings of FIGS. 2 to 4.

The method comprises a step 100 of curing a first layer, noted layer n on FIG. 3 of the area A, during a determined curing time "C".

The curing time C is noted as corresponding to two time units on FIG. 3.

Next, the method comprises a step 110 of curing a first layer n of the area B, during the determined curing time C.

In parallel of step 110, the method further comprises a step 120 of partially layering the first layer n of area A, during the curing of area B.

The layering step if performed during a layering time L corresponding to six time units on FIG. 3.

Next, the method comprises a step 130 of curing a first layer n of the area C, during the determined curing time C.

In parallel of step 130, the method further comprises both step 120 of partially layering the first layer n of area A and a step 140 of partially layering the first layer n of area B, during the curing of area C.

Next, the method comprises a step 150 of curing a first layer n of the area D, during the determined curing time C.

In parallel of step 150, the method further comprises both step 120 of partially layering the first layer n of area A, step 140 of partially layering the first layer n of area B, and a step 160 of partially layering the first layer n of area C, during the curing of area D.

When the curing step 150 is finished, the method further comprises a further layering step 170 of partially layering the first layer n of area D When the curing of the first layers n of the ophthalmic devices 10 on the building platforms 6 corresponding to areas A to D is finished, the method reboots to step 100 for the layer n+1 etc.

FIG. 3 shows the manufacturing of layers n and n+1, including curing and layering steps described above, which are performed successively and continuously.

It is noted that curing a layer includes curing a determined volume of the predetermined material so as to harden the dedicated layer.

As shown on FIGS. 2 and 3, the method thus comprises the step of additively manufacturing a plurality of layers n, n+1 of the predetermined material on different building platforms 6 with the same and single curing device and thanks to curing and layering steps which are performed at least partially at the same time but on different building platforms and thus for different ophthalmic devices 10.

In other words, there is no need to wait for the complete curing of all the layers of the ophthalmic devices on the buildings platforms before beginning the layering, so that the production time can thus be reduced.

The method is iterative and when the first volume of the predetermined material on the last building platform has been cured, then a second volume of the predetermined material on the first building platform can be cured, etc.

Because the layering step of a building platform begins at the latest when the curing step of this building platform is finished, and depending of the number of platforms, curing process time and layering process time, some waiting time might be added before curing a novel layer on the same platform. During such waiting time, that can be equated to a dark polymerisation period as described above or not, the previous layer is hardened and recovered by a volume of predetermined material.

Figure 5:
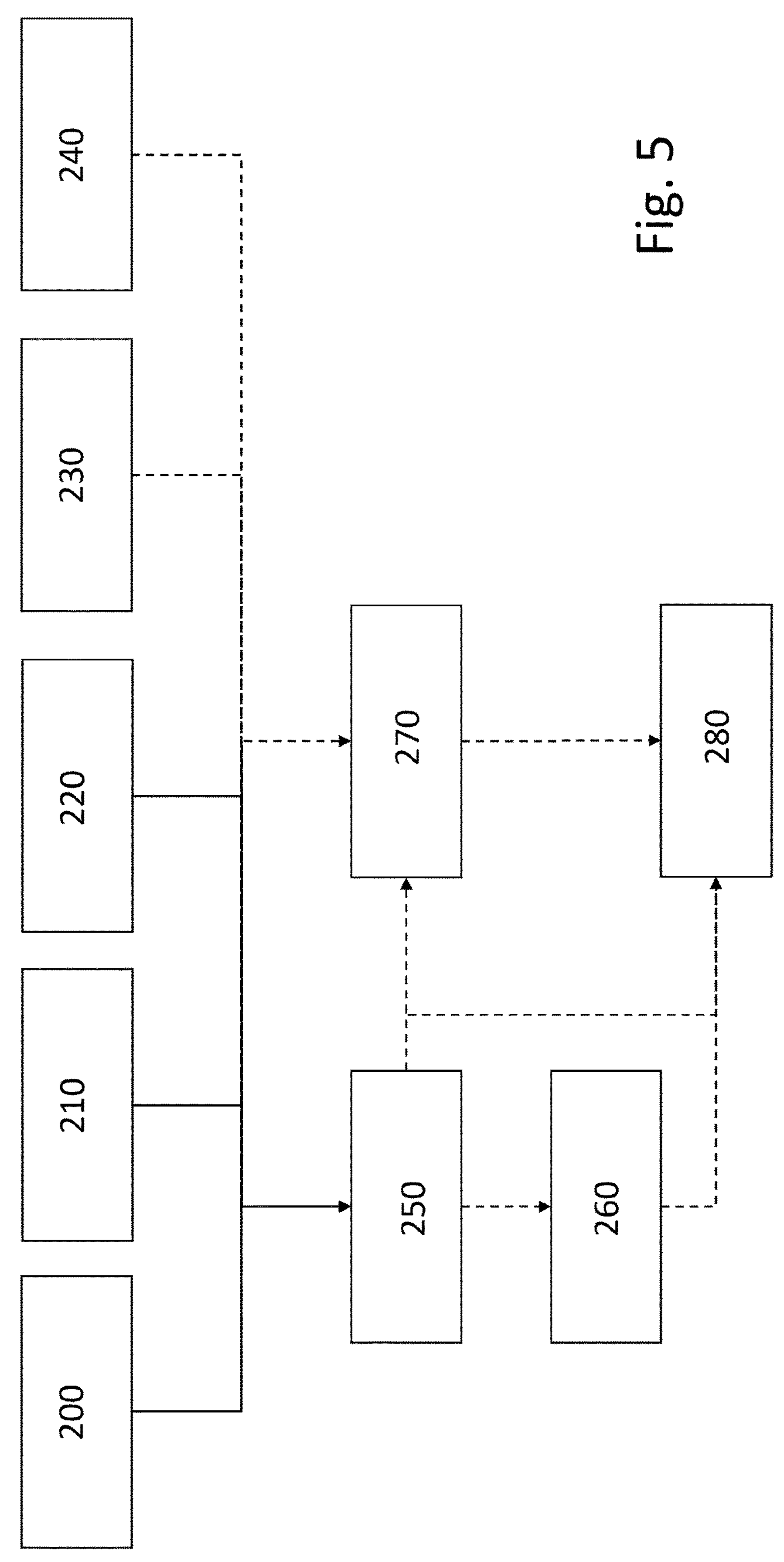
FIG. 5 illustrates other steps of the method for optimizing an arrangement of the manufacturing system.

FIG. 5 illustrates a method for determining a number of building platforms 6 to be used, and next an optimize arrangement of the manufacturing system 1.

As described above, the number of building platforms is determined and the arrangement of the manufacturing system can be optimized.

In particular, in reference to FIG. 5, the method comprise a step 200 of receiving data about the predetermined material 3, including intrinsic properties such as viscosity, refractive index, curing path, etc.

The method further comprise a step 210 of receiving data about the curing step, and in particular the curing time.

The method further comprise a step 220 of receiving data about the layering step, and in particular the layering time.

The method further comprise a step 230 of receiving data about the number of ophthalmic devices 10 to be manufactured.

The method further comprise a step 240 of receiving data about the shape of the ophthalmic devices 10, including for instance the diameter, the outline, the curvature, the thickness and/or the orientation.

Next, the method comprises a step 250 of determining the number of building platforms 6 in function of data received on steps 210 to 240, and in particular in function of the predetermined material 3, the curing time for the single curing device 4 to cure a volume of the predetermined material 3 to form a hardened layer of at least one ophthalmic device 10, and the layering time for the layering device(s) 5 to provide a volume of the predetermined material to form a subsequent layer to be hardened of at least one ophthalmic device 10.

In addition, the method may comprise a step 260 of determining the size and/or the shape of the building platform 6 in function of the data received on steps 210 to 240, and in particular in function of the number of ophthalmic devices 10 to be manufactured and/or at least a shape of the ophthalmic devices 10, and optionally in function of the curing time and/or to the layering time of at least a layer of an ophthalmic device 10.

Optionally, the method may comprise a step 270 of determining the number of layering devices 5 at least in function of the number of building platforms 6 determined in step 250, and data received in steps 210 and 220 about the curing time and the layering time of at least a layer of an ophthalmic device 10.

Also optionally, the method may comprise a step 280 of determining an optimized arrangement of the system 1, for instance defined by a number and a type of modules 9, and in function of the data received and/or determined in the previous steps 200 to 270, for instance the predetermined material 3, the number of building platforms 6 and/or the size and the shape of each building platform 6, and/or also the number of layering devices 5, and/or the curing time and/or the layering time.

The productivity in mass production can be a focused parameter for determining the optimized arrangement of the system 1.

However, productivity cannot be detrimental to optical quality especially in the case of ophthalmic lenses.

For instance, steps 250 to 270 can be performed by fixing a number of ophthalmic devices 10 to be manufactured either in the manufacturing system or on each building platform 6, depending on the type of curing device used. Then, the layering time can be fixed for layering the ophthalmic devices 10 on one building platform 6, depending on the layering device used, and depending optionally also of the polymerisation level of the cured ophthalmic devices 10. All these parameters can be re-evaluate once the number of building platform 6 has been determined, so that to obtain an optimized arrangement of the system 1, depending on the parameter of interest, amongst productivity and quality, and compromise of both.

It should be noted more generally that the disclosure is not limited to the examples described and represented.

The invention claimed is:

1. A manufacturing system configured to carry out a method for additively manufacturing a plurality of ophthalmic devices, the manufacturing system comprising:

at least one tank filled with a volume of a predetermined material;

a single curing device configured to cure volumes of the predetermined material to harden layers of the ophthalmic devices to be manufactured;

a layering device configured to layer volumes of the predetermined material onto harden layers of the ophthalmic devices to be manufactured; and a determined number of a plurality of building platforms movable relative to the at least one tank and on which are supported the ophthalmic devices to be manufactured, the number of building platforms being determined at least in function of:

the predetermined material, a curing time for the single curing device to cure a volume of the predetermined material to form a hardened layer of at least one ophthalmic device, and a layering time for the layering device to provide a volume of the predetermined material to form a subsequent layer to be hardened of at least one ophthalmic device, the number of the building platforms being determined so that the layering device and the single curing device are able to respectively perform a curing step and a layering step simultaneously on layers of different ophthalmic devices.

2. The manufacturing system according to claim 1, wherein the building platforms are distinct and movable relative to each other and to the at least one tank.

3. The manufacturing system according to claim 2, wherein the system is configured so that the single curing device is able to perform a curing operation on one or several of the building platforms while the layering device is able to perform a layering operation on one or several others of the building platforms.

4. The manufacturing system according to claim 3, further comprising a determined number of layering devices determined in function of the number of the building platforms, the curing time, and the layering time.

5. The manufacturing system according to claim 4, further comprising a layering device of the determined number of layering devices dedicated to each or several building platforms.

6. The manufacturing system according to claim 1, further comprising a determined number of layering devices determined in function of the number of the building platforms, the curing time, and the layering time.

7. The manufacturing system according to claim 6, further comprising a layering device of the determined number of the layering devices dedicated to each or several of the building platforms.

8. The manufacturing system according to claim 7, wherein the at least one tank comprises one or a plurality of compartments and at least one of the building platforms is movable relative to a dedicated compartment.

9. The manufacturing system according to claim 6, wherein each of the building platforms comprises a determined size and a determined shape, the size and the shape of the building platform being determined in function of one or more of (i) a number of ophthalmic devices to be manufactured and (ii) at least a shape of said ophthalmic devices, and in relation to one or more of (i) the curing time and (ii) the layering time.

10. The manufacturing system according to claim 9, further comprising a processor configured to process data about one or more of: the predetermined material, the number of building platforms, the size of each of the building platforms, the shape of each of the building platforms, the number of layering devices, the curing time, and the layering time, the processor being configured to provide an optimized arrangement of the manufacturing system.

11. The manufacturing system according to claim 10, further comprising interchangeable modules comprising at least one of the building platforms, and a compartment of the tank, the number and the type of modules being determined in function of the optimized arrangement.

12. The system of claim 11, wherein the interchangeable modules further comprise a dedicated layering device.

13. The manufacturing system according to claim 1, wherein the single curing device is formed by one or more of a digital light processor, and a stereolithography system including a laser source and a scanning head.

14. The manufacturing system according to claim 1, wherein the layering device is formed by one of a transparent window located in the at least one tank in front of the building platform, a provider of additional material, at least a print head, and at least a nozzle.

* * * * *